United States Patent [19]

Uchida

[11] Patent Number: 4,634,159
[45] Date of Patent: Jan. 6, 1987

[54] HARNESS SUPPORTING STRUCTURE AT INNER PART OF DOOR

[75] Inventor: Katsuyoshi Uchida, Sagamihara, Japan

[73] Assignee: Nissan Motor Co., Ltd., Yokohama, Japan

[21] Appl. No.: 833,025

[22] Filed: Feb. 26, 1986

[30] Foreign Application Priority Data

Feb. 27, 1985 [JP] Japan ................................ 60-36443

[51] Int. Cl.⁴ .............................................. E05B 3/00
[52] U.S. Cl. ................................ 292/336.3; 292/337; 292/DIG. 23
[58] Field of Search ............... 70/237; 292/337, 336.3, 292/DIG. 23, 201

[56] References Cited

U.S. PATENT DOCUMENTS

| | | | |
|---|---|---|---|
| 3,854,763 | 12/1974 | Zawadzki et al. | 292/201 |
| 4,052,094 | 10/1977 | Widen | 292/337 X |
| 4,054,307 | 10/1977 | Carella et al. | 292/336.3 X |
| 4,342,209 | 8/1982 | Kleefeldt | 292/DIG. 23 X |

*Primary Examiner*—Carl D. Friedman
*Assistant Examiner*—Naoko N. Slack
*Attorney, Agent, or Firm*—Schwartz, Jeffery, Schwaab, Mack, Blumenthal & Evans

[57] ABSTRACT

A wire harness supporting structure in a door according to the present invention includes a reinforced bracket having a guide and a pair of harness holders projecting upward from the guide. The reinforced bracket is fastened jointly with a doorlock to the internal part of the door. The wire harness extended from the electrical part is laid along the guide and fixed and supported at the harness holders.

5 Claims, 5 Drawing Figures

HARNESS SUPPORTING STRUCTURE AT INNE PART OF DOOR

BACKGROUND OF THE INVENTION (1) Field of the Invention

The present invention relates to the supporting structure of the wire harness for electrical parts located in the internal space formed between the inner panel and outer panel of the door.

(2) Description of the Prior Art

In the existing system, in the internal space formed inbetween the inner panel and outer panel of the door, wire harness for the electrical parts such as keyhole illuminator or keyless entry system etc are arranged.

In the example shown in FIG. 1 for the existing system, the aforementioned wire harness 14 for electrical part 12 is supported by the guide 16.

However, in accordance with the above mentiond FIG. 1 for the existing structure, when the width of the space within the door is narrowed down or made into a flushed surface to enlarge the passenger room, the installation space for the wire harness becomes very narrow. This causes difficulty in the attaching procedure of the guide 16.

In addition, when the door glass 18 is lowered, unless a certain amount of interval is secured between the door glass 18 and guide 16, there may be interference between them during opening and closing of the door. Thus to secure this interval, it becomes difficult to narrow down this width.

SUMMARY OF THE INVENTION

The object of the present invention is to provide a harness supporting structure in the internal part of the door with abridgement in the material of the guide to improve the efficiency of the internal space.

The other object of the present invention is to provide a harness supporting structure in the internal part of the door which can improve ease in the laying down of the wire harness within the door.

The other object of the present invention is to provide a harness supporting structure in the internal part of the door which can positively support the wire harness even if the internal space of the door is small.

One of the feature of the present invention is that a reinforced bracket which has a guide and harness holders provided on the guide is fastened jointly with a doorlock in the internal space of the door. The wire harness which is extended from the electrical part is laid along the aforementioned guide and fixed and supported at the harness holders.

These and other objects, features and advantages of the invention will be more understood from the following detailed description of the invention with reference to the attached drawings.

DESCRIPTION OF THE PREFERRED EMBODIMENTS

Figure 1:
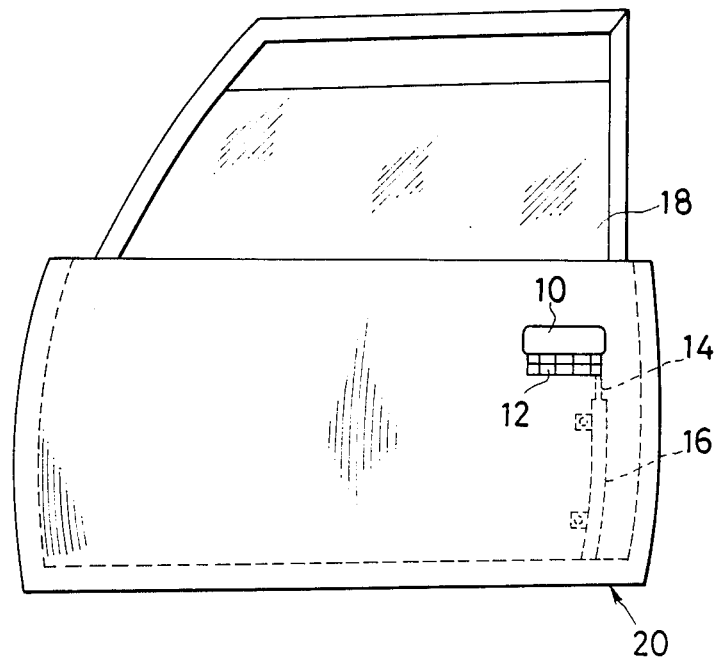
FIG. 1 is an elevation of the door with the prior art wire harness supporting structure.
Figure 2:
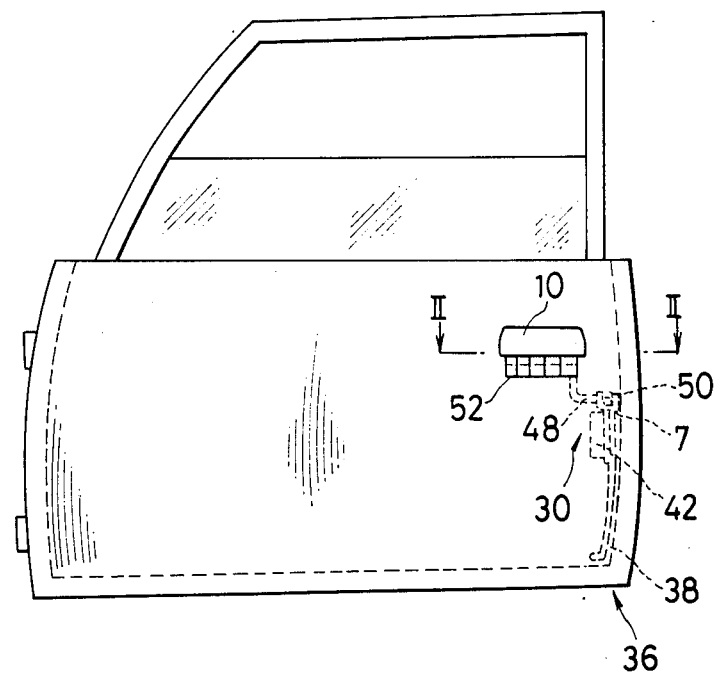
FIG. 2 is an elevation of a door with a wire harness supporting structure embodying the present invention.
Figure 3:
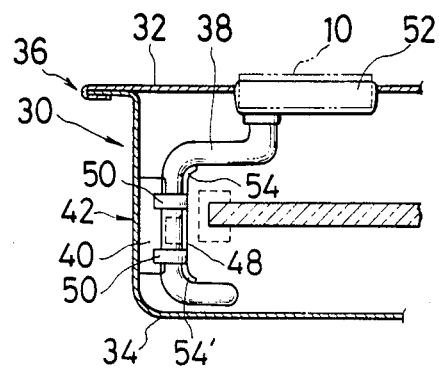
FIG. 3 is an enlarged cross sectional view through line II—II of FIG. 2.

Referring to FIGS. 2 and 3, the wire harness supporting structure according to the present invention is shown with the reference number 30.

Figure 4:
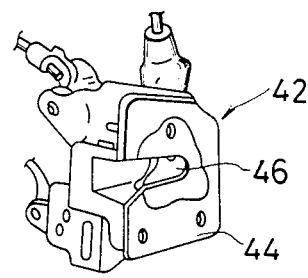
FIG. 4 is the diagonal view of the door lock shown in FIG. 3.

In this wire harness supporting structure 30, the door lock 42 is jointly fastened via the reinforced bracket 40, which has the function to support the wire harness 38, to a inner panel 34 of the door 36 formed by an outer panel 32 and the inner panel 34. As shown in FIG. 4, the door lock 42 is provided with a lock unit 44 which has the function to maintain the above mentioned door in locked position. In this lock unit 44, a lock mechanism or a lock operating mechanism (neither of which is shown in any of the schematics) is provided to restrict or release the movement of a latch 46 which can freely engage or disengage with the chasis side striker.

Figure 5:
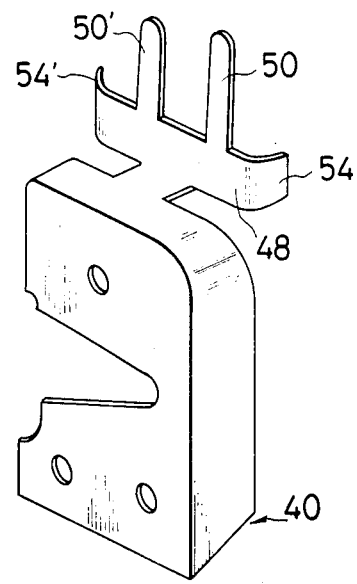
FIG. 5 is the diagonal view of the reinforced bracket shown in FIG. 3.

The reinforced bracket 40 as shown in FIG. 5 has a shape almost identical to that of the lock unit 44 to easy the fastening of it together with the lock unit 44 when installed on the inner panel 34 of the door.

On the reinforced bracket 40, for guiding the wire harness 38 over the lock unit, the guide 48 rises vertically from the upper edge of the bracket 40, and facing this, a pair of the harness holders 50, 50' project upward integrally with the guide 48 for fixing the wire harness 38 on the guide 48. Both sides of the guide 48 are bent at short length on the outward side to form the flanges 54, 54' so that the wire harness 38 extending from the electrical part 52 can be guided in easily.

Further, the harness holders 50, 50' are made into a tongue shape in order that the aforementioned guide 48 can be folded over horizontally.

The installation procedure of the wire harness is explained in the next. The reinforced bracket 40 is jointly fastened with the door lock 42 on the inner panel 34. At this time the harness holders 50, 50' are left in a standing-up position. Next, the wire harness 38 extending from the electrical part 52 is laid along the guide 48. In this case, the wire harness 38 can be guided in smoothly without getting caught in by both the flanges 54, 54' bent on the outward side.

Thereafter, the harness holders 50, 50' are folded over to fix and support the wire harness 38 on the guide 48. This prevents the shaking of wireharness 38.

It is advisable to support the lower end of the wire harness extending downwards from the guide 48 with dips etc.

In summary, according to the present invention, the harness supporting structure at the internal part of the door can positively support the wire harness even if the space inside the door is small. Moreover, due to abbreviation of material for the guide, the workability improves with the reduction of cost at the same time.

Various modifications will become possible for those skilled in the present disclosure without departing from the scope thereof.

What is claimed is:

1. A wire harness supporting structure for supporting a wire harness which is extended from an electrical parts in an internal space of a door, comprising:

(a) a door lock for maintaining the door in locked position; and (b) a reinforced bracket fastened to the door together with said door lock for supporting the wire harness,
(c) said reinforced bracket having,
a guide for guiding the wire harness, and
a harness holder being foldable for fixing and supporting the wire harness on the guide.

2. A wire harness supporting structure as claimed in claim 1, in which the door is formed by the outer panel and the inner panel, said door lock being jointly fastened to the inner panel via said reinforced bracket.

3. A wire harness supporting structure as claimed in claim 2, in which said door lock is provided with the lock unit, said reinforced bracket having a shape almost identical to that of the lock unit to easy the fastening of said reinforced bracket together with the lock unit.

4. A wire harness supporting structure as claimed in claim 1, in which the guide of said reinforced bracket has flanges formed by bending the both sides of the guide to easily guide the wire harness.

5. A wire harness supporting structure as claimed in claim 1, in which the guide of said reinforced bracket rises vertically from the upper edge of said reinforced bracket, the pair of harness holders prejecting upward integrally with the guide.

* * * * *